US 10,156,168 B2

(12) United States Patent
Hashimoto

(10) Patent No.: US 10,156,168 B2
(45) Date of Patent: Dec. 18, 2018

(54) OIL SEPARATOR

(71) Applicant: NIFCO INC., Yokosuka-shi, Kanagawa (JP)

(72) Inventor: Shoichiro Hashimoto, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 223 days.

(21) Appl. No.: 15/026,468

(22) PCT Filed: Sep. 19, 2014

(86) PCT No.: PCT/JP2014/004823
§ 371 (c)(1),
(2) Date: Mar. 31, 2016

(87) PCT Pub. No.: WO2015/049843
PCT Pub. Date: Apr. 9, 2015

(65) Prior Publication Data
US 2016/0245137 A1    Aug. 25, 2016

(30) Foreign Application Priority Data

Oct. 1, 2013 (JP) .................................. 2013-206670

(51) Int. Cl.
*B01D 47/00*     (2006.01)
*F01M 13/04*     (2006.01)
(Continued)

(52) U.S. Cl.
CPC ............. *F01M 13/04* (2013.01); *B01D 45/08* (2013.01); *B01D 45/12* (2013.01); *B01D 45/16* (2013.01);
(Continued)

(58) Field of Classification Search
CPC ........... F01M 13/04; F01M 2013/0461; F01M 2013/0038; F01M 2013/0427;
(Continued)

(56) References Cited

U.S. PATENT DOCUMENTS 6,290,738 B1     9/2001   Holm
6,797,040 B2 *   9/2004   Lenzing ................. B01D 45/06
                                                              55/462
(Continued)

FOREIGN PATENT DOCUMENTS

CN      102228748 A    11/2011
DE   102004049089 A1    4/2006
(Continued)

OTHER PUBLICATIONS

China Patent Office, "Office Action for Chinese Patent Application No. 201480054256.9," Aug. 28, 2017.
(Continued)

Primary Examiner — Dung H Bui
(74) Attorney, Agent, or Firm — Manabu Kanesaka

(57) ABSTRACT

An oil separator for separating an oil in a blow-by gas, includes a housing forming a flow passage, and defining an annular shoulder face facing a downstream side; a valve member reciprocatable between a blocking position abutting an end face thereof against the annular shoulder face to block the flow passage, and an open position separating the end face from the annular shoulder face to open the flow passage; a spring device urging the valve member toward the blocking position; and a reflux device for refluxing the oil separated from the blow-by gas. The valve member includes a first side face facing a wall face of the flow passage and spaced from the wall face at a predetermined interval. A relation wherein a gap between the end face of the valve member and the annular shoulder face in the open position
(Continued)

is narrower than the predetermined interval is always established.

10 Claims, 4 Drawing Sheets

(51) Int. Cl.
    *B01D 45/12*     (2006.01)
    *B01D 45/08*     (2006.01)
    *B01D 45/16*     (2006.01)
    *F01M 13/02*     (2006.01)
    *B01D 50/00*     (2006.01)
    *F01M 13/00*     (2006.01)

(52) U.S. Cl.
    CPC ......... *B01D 50/002* (2013.01); *F01M 13/023* (2013.01); *F01M 2013/0038* (2013.01); *F01M 2013/0044* (2013.01); *F01M 2013/0427* (2013.01); *F01M 2013/0433* (2013.01); *F01M 2013/0461* (2013.01)

(58) Field of Classification Search
    CPC ... F01M 2013/0044; F01M 2013/0433; F01M 13/023; B01D 45/08
    See application file for complete search history.

(56) References Cited

U.S. PATENT DOCUMENTS

| | | | |
|---|---|---|---|
| 8,042,529 B2 | 10/2011 | Meinig et al. | |
| 2002/0100465 A1 | 8/2002 | Pietschner | |
| 2003/0075046 A1 | 4/2003 | Lenzing | |
| 2009/0199826 A1* | 8/2009 | Meinig | B01D 45/08 123/573 |
| 2010/0101425 A1 | 4/2010 | Herman et al. | |
| 2010/0294218 A1* | 11/2010 | Ruppel | F01M 13/021 123/41.86 |
| 2012/0159912 A1* | 6/2012 | Ruppel | B01D 45/08 55/462 |
| 2016/0138442 A1* | 5/2016 | An | F01M 13/021 123/559.1 |

FOREIGN PATENT DOCUMENTS

| | | |
|---|---|---|
| DE | 202005009990 U1 | 11/2006 |
| DE | 10362162 B4 | 4/2008 |
| DE | 102008044857 A1 | 8/2010 |
| JP | S63-90013 U | 6/1988 |
| JP | 2009-191631 A | 8/2009 |
| JP | 2011-047354 A | 3/2011 |
| JP | 2013-087671 A | 5/2013 |

OTHER PUBLICATIONS

Korea Patent Office, "Office Action for Korean Patent Application No. 10-2016-7007628," dated Nov. 8, 2016.
Europe Patent Office, "Search Report for European Patent Application No. 14850406.1," dated Jun. 16, 2017.
PCT, "International Search Report for International Application No. PCT/JP2014/004823".

* cited by examiner

OIL SEPARATOR

CROSS-REFERENCES TO RELATED APPLICATIONS

The present application is National Phase of International Application No. PCT/JP2014/004823 filed Sep. 19, 2014, and claims priority from Japanese Application No. JP2013-206670 filed Oct. 1, 2013, the disclosure of which is incorporated herein.

FIELD OF TECHNOLOGY

The present invention relates to an oil separator for separating an oil in a blow-by gas for an internal combustion engine.

BACKGROUND ART

In an engine for an automobile and the like, the blow-by gas leaking out into a crank case through a gap between a piston and a cylinder includes a large amount of hydrocarbon (HC). Since the hydrocarbon is a causative material of photochemical smog, a recirculation method is widely used, which returns the blow-by gas to an inlet system to burn again with an air-fuel mixture without emitting the blow-by gas to the atmosphere. Since the blow-by gas includes the oil wherein an engine oil and the like are pulverized, the gas after the oil is removed is sent to the inlet system. As for a device for separating an oil mist inside the blow-by gas, various types (an inertial collision type, a labyrinth type, a cyclone type, and the like) of oil separators are known.

In Patent Document 1, there is described an inertial-collision-type oil separator. In the oil separator, there is attached a leaf spring closing an opening portion of a flow passage in such a way as to be supported in a cantilever manner. The leaf spring is elastically deformed so as to generate a gap between the opening portion and the leaf spring, and the blow-by gas accelerates when it passes through the gap thereof. After that, the accelerated blow-by gas collides against a wall provided on a downstream side, so that the oil mist contained in the blow-by gas is attached to the wall by an inertial action to be collected. In this system, the blow-by gas collides against the wall at a high speed, so that even if an oil particle has a relatively small diameter, the oil separator can collect the oil particle.

PRIOR ART DOCUMENT

Patent Document

Patent Document 1: German Patent No. 10362162 Specification

SUMMARY OF THE INVENTION

Problems to be Solved by the Invention

In the oil separator described in the aforementioned Patent Document 1, however, since the leaf spring is supported in the cantilever manner, it is difficult to provide the wall against which the high-speed blow-by gas collides on a fixation end side of the leaf spring, so that a space cannot be effectively used so as to limit a collection efficiency of the oil.

The present invention is made in view of the aforementioned conventional technical problems, and a main object of the present invention is to provide an oil separator wherein the collection efficiency of the oil is improved.

Means for Solving the Problems

In a first aspect of an oil separator according to the present invention, an oil separator (10) for separating an oil in a blow-by gas for an internal combustion engine, comprises a housing (12) forming a flow passage of the blow-by gas, and defining an annular shoulder face (42) facing a downstream side; a valve member (36) disposed inside the flow passage, and reciprocating between a blocking position abutting an end face thereof against the annular shoulder face to block the flow passage, and an open position separating the end face from the annular shoulder face to open the flow passage; a spring device (40) for urging the valve member toward the blocking position; and a reflux device (22) provided inside the housing for refluxing the oil separated from the blow-by gas to a crank chamber. The valve member comprises a first side face (54) facing a wall face of the flow passage at the downstream side of the annular shoulder face and spaced from the wall face at a predetermined interval. A spring constant of the spring device is set such that the valve member moves to the open position against an urging force of the spring device by a differential pressure inside the flow passage, and there is always established a relation in which a gap (B) between the end face of the valve member and the annular shoulder face in the open position is narrower than the interval (A) between the first side face of the valve member and the wall face of the flow passage regardless of a flow volume of the blow-by gas.

According to the structure, even in a case with a small flow volume thereof, a flow speed of the blow-by gas accelerates at the gap between the valve member and the annular shoulder face, and the blow-by gas collides against the wall extending from the annular shoulder face to the downstream side at a high speed, and since a collided portion thereof extends across a whole circumference of the wall, an oil with a small diameter can be effectively separated.

As for another aspect of the present invention, in the aforementioned structure, the spring constant of the spring device is set such that there is established the relation in which the gap is always narrower than the interval regardless of the flow volume of the blow-by gas.

According to the structure, without using a control device controlling a movement of the valve member separately, a movable range of the valve member can be limited so as to suppress an increase in the number of parts.

As for another aspect of the present invention, in the aforementioned structure, the annular shoulder face comprises a projecting piece (46) annularly formed coaxially in the annular shoulder face, and abuts against the valve member at a tip of the projecting piece.

According to the structure, a groove (48) is formed on a downstream side of the projecting piece so as to reduce a pressure loss due to friction.

As for another aspect of the present invention, in the aforementioned structure, the projecting piece comprises an inner peripheral face formed in such a way as to increase an inner diameter as extending toward a downstream.

According to the structure, the pressure loss of the blow-by gas moving toward the gap between the projecting piece and the valve member can be reduced so as to increase the flow speed of the blow-by gas.

As for another aspect of the present invention, in the aforementioned structure, the valve member includes a second side face (56) extending from the first side face to the downstream side, and formed to separate from the wall face of the flow passage as extending toward the downstream.

According to the structure, the pressure loss of the blow-by gas can be reduced.

As for another aspect of the present invention, in the aforementioned structure, the flow passage comprises a plurality of branching flow passages disposed in parallel, and the annular shoulder face and the valve member are provided in the respective branching flow passages.

According to the structure, an oil separation performance from the blow-by gas can be improved, and the pressure loss can be suppressed.

As for another aspect of the present invention, in the aforementioned structure, a direction of the aforementioned reciprocation of the valve member is a vertical direction, and the reflux device is disposed below the valve member.

According to the structure, the separated oil drops downward by self-weight, and is guided to the reflux device so as to easily and surely reflux the oil by the simple reflux device.

As for another aspect of the present invention, in the aforementioned structure, in the housing, there is formed a pre-separate portion (16) formed from one portion of the flow passage at an upstream side of the annular shoulder face, and the flow passage of the pre-separate portion comprises a constricted portion (24) wherein a flow passage cross-sectional area is constricted and a bent portion (26) disposed on a downstream side of the constricted portion, and including a flow passage bent relative to the flow passage of the constricted portion.

According to the structure, an oil particle with a relatively large particle diameter is collected at the pre-separate portion so as to prevent or restrict the clogging of the oil between the valve member and the housing.

Effect of the Invention

According to the present invention, a collection efficiency of the oil with a small diameter (about 1 μm) contained in the blow-by gas can be improved.

BEST MODES OF CARRYING OUT THE INVENTION

Figure 1:
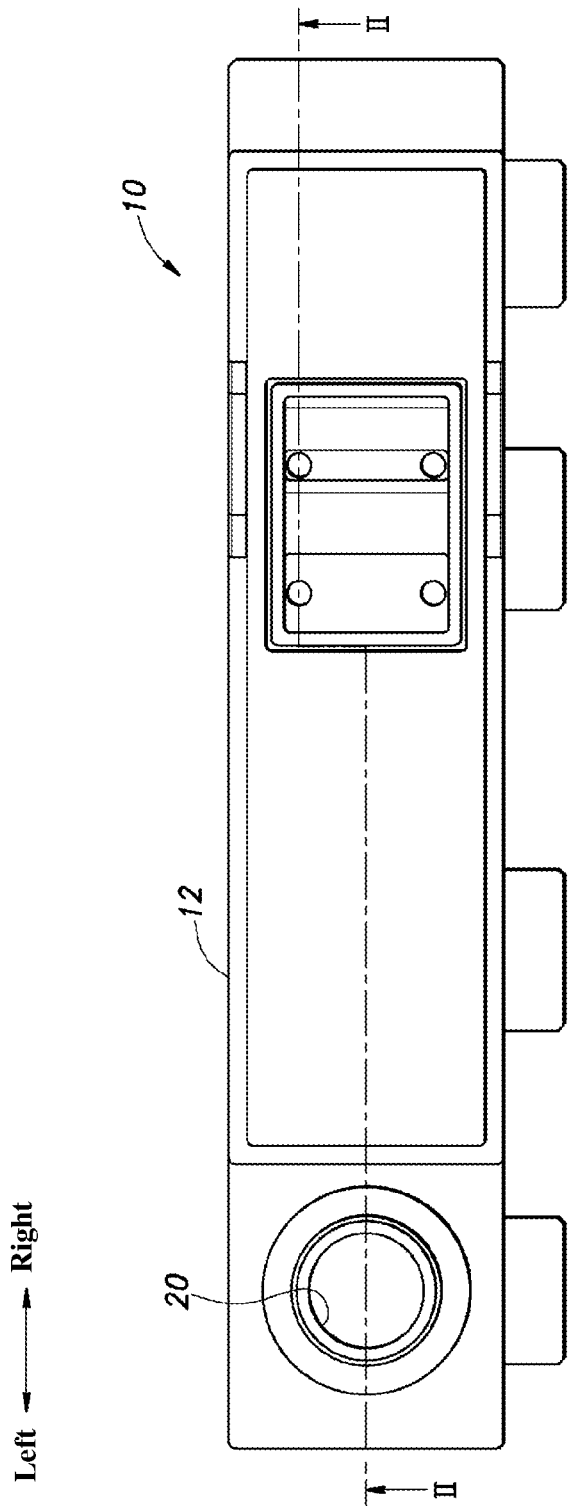
FIG. 1 is a plan view of an oil separator according to an embodiment of the present invention.
Figure 2:
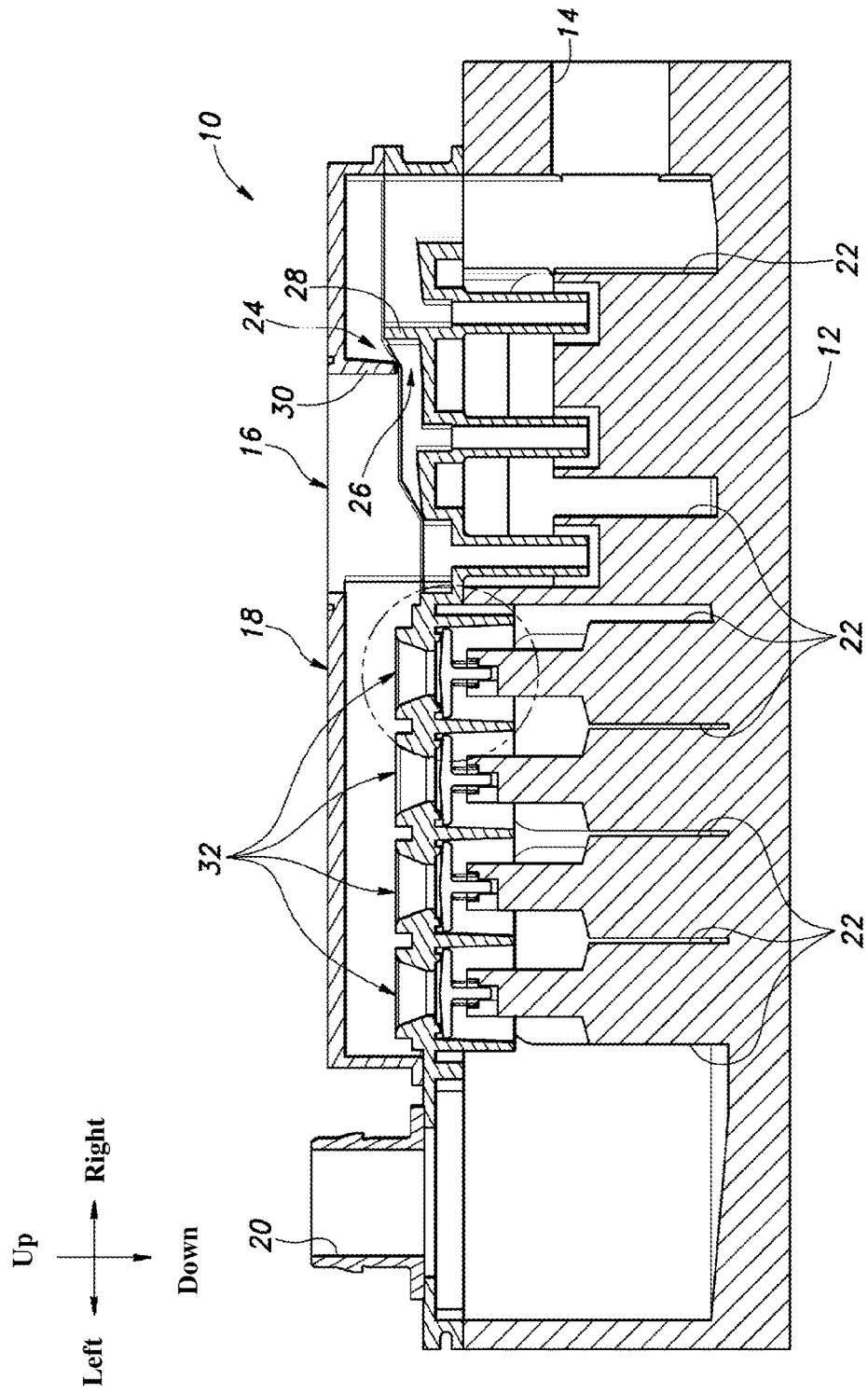
FIG. 2 is a cross-sectional view taken along a line II-II in FIG. 1.
Figure 3:
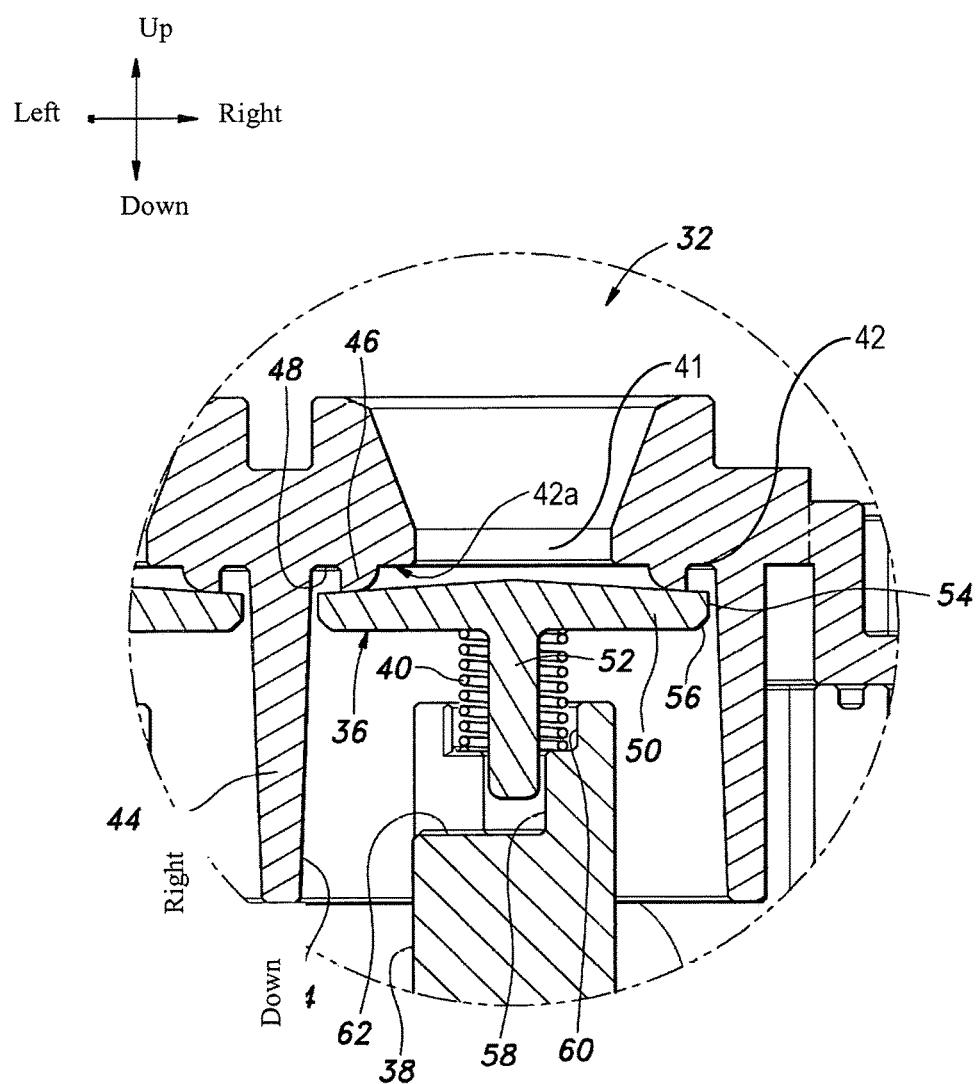
FIG. 3 is an enlarged cross-sectional view (a state wherein a valve is closed) of essential portions of the oil separator according to the embodiment of the present invention.
Figure 4:
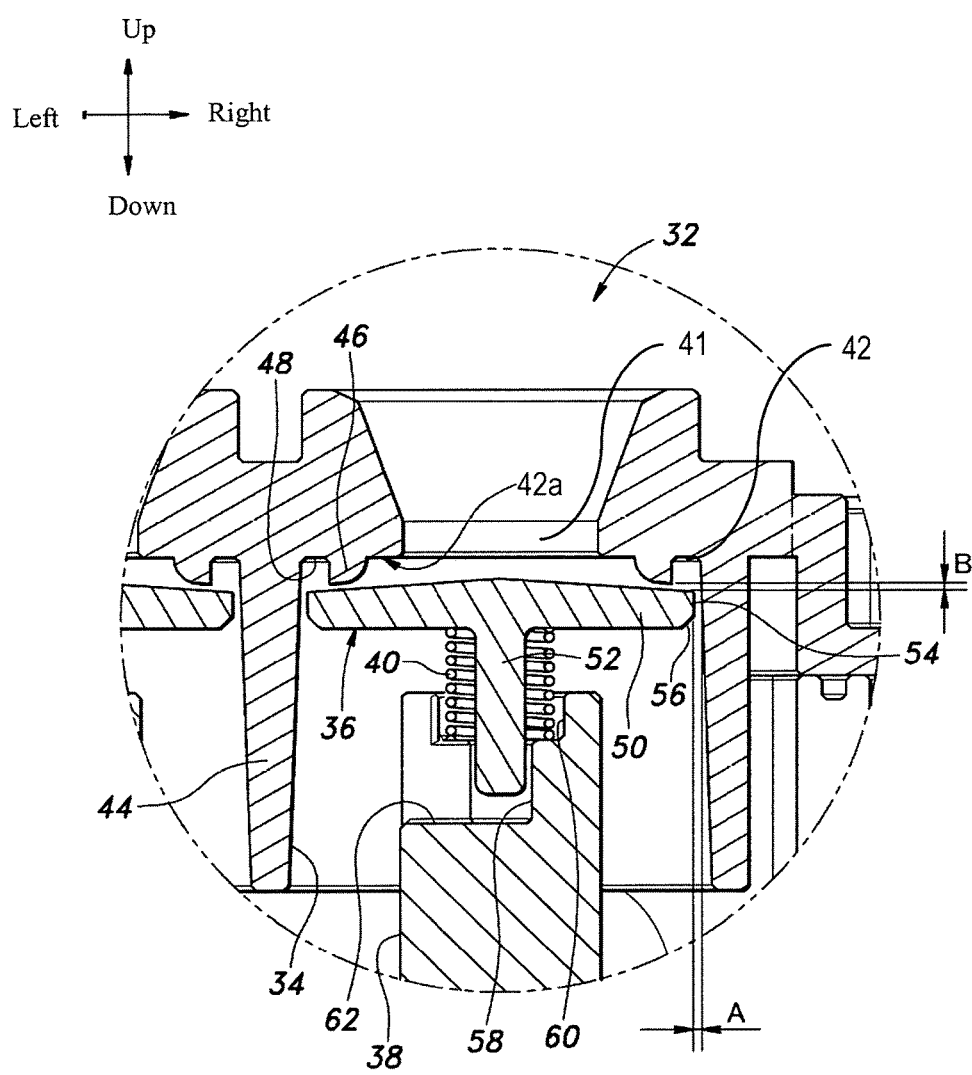
FIG. 4 is an enlarged cross-sectional view (a state wherein the valve is open) of the essential portions of the oil separator according to the embodiment of the present invention.

Hereinafter, an embodiment of the present invention will be explained with reference to the drawings. In the explanation, terms indicating directions follow directions shown in the drawings. FIG. 1 is a plan view of an oil separator according to the embodiment of the present invention, and FIG. 2 is a cross-sectional view taken along a line II-II in FIG. 1. Also, FIG. 3 and FIG. 4 are enlarged cross-sectional views of essential portions (portions surrounded by a two-dot chain line in FIG. 2) of the oil separator according to the embodiment of the present invention, wherein FIG. 3 shows a state in which a valve is closed; and FIG. 4 shows a state in which the valve is open.

In a blow-by gas recirculation device provided in an engine of an automobile (not shown in the drawings), an oil separator 10 is used as a device for separating an oil (oil mist) inside a blow-by gas. The oil separator 10 is provided integrally with or separately from a head cover of an upper portion of the engine.

Referring to FIG. 1 and FIG. 2, the oil separator 10 comprises a housing 12, and inside the housing 12, from a right side (upstream side) toward a left side (downstream side) in sequence, there are formed a lead-in port 14 into which the blow-by gas is introduced; a pre-separate portion 16 for separating an oil with a relatively large particle diameter; a main separate portion 18 for separating an oil with a relatively small particle diameter; and a lead-out port 20 guiding the blow-by gas to an outside. Moreover, inside the housing 12, there are formed oil reflux passages 22 for refluxing the oil collected at the pre-separate portion 16 and the main separate portion 18 to a crank chamber (not shown in the drawings). The housing 12 is formed by a synthetic resin material or metal, and has an approximately box-like outer shape.

The lead-in port 14 is communicated with the crank chamber, and introduces the blow-by gas inside the crank chamber to the pre-separate portion 16.

A flow passage of the pre-separate portion 16 comprises a constricted portion 24 wherein a flow passage cross-sectional area thereof is constricted compared to that of front and rear sections thereof; and a bent portion 26 formed on a nearby downstream side of the constricted portion 24. In the flow passage of the pre-separate portion 16, in the flow passage extending approximately to right and left, there are provided a first partition plate 28 protruding upward from a lower face of the flow passage; and a second partition plate 30 placed on the left side of the first partition plate 28, and protruding downward from an upper face of the flow passage. An upper end of the first partition plate 28 is higher than a lower end of the second partition plate 30. A distance between the first partition plate 28 and the second partition plate 30 is smaller than a height of the flow passage of the front and rear sections thereof. Namely, a flow passage cross-sectional area between the first partition plate 28 and the second partition plate 30 is smaller than the flow passage cross-sectional area of the front and rear sections thereof. A portion where the first partition plate 28 and the second partition plate 30 face each other is the constricted portion 24, and a portion extending to the downstream side in such a way as to be approximately orthogonal to the first partition plate 28 is the bent portion 26.

Referring to FIG. 2, after the blow-by gas introduced from the lead-in port 14 rises once, the blow-by gas flows to the left side in the pre-separate portion 16, and the direction of the blow-by gas is changed downward in the constricted portion 24 formed by the first partition plate 28 and the second partition plate 30, and then, changed to the left side again in the bent portion 26. Here, in the constricted portion 24, since the flow passage cross-sectional area is small, the blow-by gas is accelerated, and a flow speed thereof rises. Then, the risen blow-by gas of the flow speed moving downward collides against the lower face of the flow passage in the bent portion 26, so that the oil is collected to the lower face of the flow passage by an inertial action. Here, an oil particle with a relatively large particle diameter, specifically, an oil particle with approximately 10 μm or more is removed from the blow-by gas. The collected oil at the pre-separate portion 16 refluxes to the crank chamber through the oil reflux passages 22 disposed below the flow passage of the blow-by gas. Here, since the oil is collected on the lower face of the flow passage, the collected oil can smoothly move to the oil reflux passages 22 by gravity. The blow-by gas in which the relatively large oil particle is removed is introduced to the main separate portion 18.

In the main separate portion 18, a relatively small oil particle, specifically, a particle with approximately 1 μm or more is removed from the blow-by gas. As shown in FIG. 2, in the main separate portion 18, the flow passage branches off to form four branching flow passages in parallel, and respectively, there are provided oil particle removal mechanisms 32 having approximately the same structure. The blow-by gas flows in the oil particle removal mechanisms 32 downward from approximately the upper side. Since the branching flow passages are communicated with one flow passage again, the blow-by gas passed through the oil particle removal mechanisms 32 joins together to become one flow. FIG. 3 and FIG. 4 are the cross-sectional views wherein one of the oil particle removal mechanisms 32 is enlarged.

Referring to FIG. 3 and FIG. 4, the structure of the oil particle removal mechanism 32 will be explained. The oil particle removal mechanism 32 comprises a cylinder 34 extending in an up-and-down direction; a valve member 36 moving up and down inside the cylinder 34; a support member 38 supporting the valve member 36 movably up and down; and a spring device 40 urging the valve member 36 upward.

The cylinder 34 is formed by the synthetic resin material or metal, and may be integrally formed with the housing 12, or after being formed as a separate member, may be integrated with the housing 12 as well. On an inner face of the cylinder 34, there is formed an annular shoulder face 42 having an annular shape facing the downstream side and including a circumferential face 42a surrounding an inlet 41 of the cylinder 34. In an internal space of the cylinder 34, an upper end side has a truncated cone shape wherein a diameter thereof decreases as it goes downward, and from a lower end of the space of the truncated cone shape to the annular shoulder face 42, the internal space of the cylinder 34 has a columnar shape wherein the diameter is approximately constant. Also, below the annular shoulder face 42, the internal space of the cylinder 34 has an approximately columnar shape, or a truncated cone shape wherein the diameter thereof slightly increases as it goes downward. A peripheral wall 44 of the cylinder 34 is integrated with a peripheral wall 44 of another adjacent cylinder 34.

In the annular shoulder face 42, there is formed a projecting piece 46 functioning as a valve seat, and formed in an annular shape coaxial with the annular shoulder face 42. An inner peripheral face of the projecting piece 46 is formed such that an inner diameter thereof increases as it goes downward, and in a vertical cross-sectional view, the inner peripheral face of the projecting piece 46 has a convex shape obliquely downward on a center axis side of the cylinder 34. An outer peripheral face of the projecting piece 46 has a cylindrical surface extending approximately up and down, and faces an inner peripheral face of a lower portion of the cylinder 34 at a predetermined interval. Namely, the outer peripheral face of the projecting piece 46, an outside of the annular shoulder face 42, and the inner peripheral face of the lower portion of the cylinder 34 define an annular groove 48.

The valve member 36 is disposed below the annular shoulder face 42 of the cylinder 34, and formed by a synthetic resin or metal, and comprises a circular plate portion 50 having an approximately circular plate shape; and a shaft portion 52 extending downward from the circular plate portion 50 along a center axis thereof. An upper side end face of the valve member 36, namely, an upper face of the circular plate portion 50 can abut against a lower end (tip) of the projecting piece 46 across a whole circumference to block the branching flow passage. Also, the upper face of the circular plate portion 50 has a slightly inclined umbrella shape, so that attached oil flows toward a circumferential edge to drop. An outer peripheral face of the circular plate portion 50 is formed by a first side face 54 facing the inner peripheral face of the cylinder 34 below the annular shoulder face 42 at a predetermined interval A; and a second side face 56 extending downward from the first side face and toward an axis side in the up-and-down direction to separate from the inner peripheral face of the cylinder 34. The shaft portion 52 has a columnar shape. Center axes of the circular plate portion 50 and the shaft portion 52, namely, the center axis in the up-and-down direction of the valve member 36 approximately matches with the center axis of the cylinder 34.

The support member 38 is formed by the synthetic resin or metal, and may be integrally formed with the housing 12, or after being formed as a separate member, may be integrated with the housing 12 as well. The support member 38 has a columnar shape, and on an upper face, there are formed a receiver hole 58 receiving the shaft portion 52 of the valve member 36; and a spring receiver hole 60 receiving a lower end side of the spring device 40. The receiver hole 58 and the spring receiver hole 60 are continued and coaxial, and the spring receiver hole 60 is shallower than the receiver hole 58, and has a diameter larger than that of the receiver hole 58. The receiver hole 58 receives the shaft portion 52 of the valve member 36 with room in a horizontal direction. The receiver hole 58 has the room in the horizontal direction so as to reduce friction relative to the shaft portion 52 of the valve member 36. Also, when the valve is open, the blow-by gas flows between the first side face 54 and the second side face 56 of the circular plate portion 50 of the valve member 36, and the inner peripheral face of the cylinder 34 at a high speed, so that the valve member 36 stabilizes in a state wherein the interval between the first side face 54 and the second side face 56, and the inner peripheral face of the cylinder 34 becomes approximately uniform across the whole circumference even if there is a gap between the shaft portion 52 thereof and the receiver hole 58. Also, on the upper face of the support member 38, there is provided a horizontal groove 62 having a depth the same as that of the receiver hole 58 from the receiver hole 58 to a side face of the support member 38. Oil entered into the receiver hole 58 and the spring receiver hole 60 is discharged through the horizontal groove 62.

The spring device 40 is formed by a compression coil spring. The spring device 40 is disposed in such a way as to internally receive the shaft portion 52 of the valve member 36. The lower end side of the spring device 40 is received in the spring receiver hole 60 of the support member 38, and an upper end side of the spring device 40 is pressed against a lower face of the circular plate portion 50 of the valve member 36. Consequently, the spring device 40 urges the valve member 36 upward.

Next, an operation of the oil particle removal mechanism 32 will be explained. In a case wherein a difference between a pressure on a crank chamber side and a pressure on an inlet system side is small, an urging force of the spring device 40 surpasses, and as shown in FIG. 3, the upper side end face of the valve member 36 abuts against the tip (lower end) of the projecting piece 46 of the annular shoulder face 42 which is the valve seat to block the branching flow passage. When a pressure difference increases, a differential pressure thereof surpasses the urging force of the spring device 40, and as shown in FIG. 4, the valve member 36 moves downward, and separates the upper side end face of the valve member 36 from the tip of the projecting piece 46 to open the branching flow passage. A separate distance B between the upper side end face of the valve member 36 and the tip of the projecting piece 46 varies according to a magnitude of the differential pressure between the crank chamber side and the inlet system side; however, a spring constant of the spring device 40 is set such that the separate distance B is always smaller than the interval A between the outer peripheral face of the circular plate portion 50 and the inner peripheral face of the cylinder 34. Since the separate distance B is small, the blow-by gas sufficiently increases the speed even in a case wherein a flow volume thereof is small. Also, the separate distance B is much smaller than the distance between the first partition plate 28 and the second partition plate 30 of the pre-separate portion 16, so that the blow-by gas is greatly accelerated when it passes between the upper side end face of the valve member 36 and the tip of the projecting piece 46, and a flow speed thereof increases more than a flow speed at the constricted portion 24 of the pre-separate portion 16. Here, the space on the upper end side of the cylinder 34 has the truncated cone shape wherein the downward diameter is small, or the inner peripheral face of the projecting piece 46 has the convex shape obliquely downward on the center axis side of the cylinder 34 in the vertical cross-sectional view, so that a pressure loss of the blow-by gas up to a gap between the projecting piece 46 and the valve member 36 is small. Also, since there is provided the groove 48, compared to a case without the groove 48, in the blow-by gas passed between the upper side end face of the valve member 36 and the tip of the projecting piece 46, the pressure loss due to friction is controlled so as to suppress a speed decline.

The high-speed blow-by gas passed between the upper side end face of the valve member 36 and the tip of the projecting piece 46 collides against the inner peripheral face of the cylinder 34 in the vicinity below the annular shoulder face 42. Here, the colliding blow-by gas has a speed much higher than that of the blow-by gas in the pre-separate portion 16, so that an oil particle with a relatively small diameter up to approximately 1 μm is collected on the inner peripheral face of the cylinder 34 by the inertial action. The oil with a relatively large particle diameter of approximately 10 μm or more is collected at the pre-separate portion 16, so that only the oil with the relatively small particle diameter is collected on the inner peripheral face of the cylinder 34, so that even if the interval A between the outer peripheral face of the circular plate portion 50 and the inner peripheral face of the cylinder 34, or the separate distance B between the upper side end face of the valve member 36 and the tip of the projecting piece 46 is narrow, oil clogging can be prevented or reduced. Also, the interval A between the outer peripheral face of the circular plate portion 50 and the inner peripheral face of the cylinder 34 is larger than the separate distance B between the upper side end face of the valve member 36 and the tip of the projecting piece 46, so that an acceleration at the interval A becomes smaller than the acceleration at the separate distance B, and the oil particle inside the blow-by gas collides against the inner peripheral face in accordance with inertia.

After the collision, the blow-by gas moves downward; however, a distance between the second side face 56 of the circular plate portion 50 of the valve member 36 and the inner peripheral face of the cylinder 34 widens as it goes downward so as to reduce the pressure loss. The blow-by gas passed through the cylinder 34 moves toward the lead-out port 20 (see FIG. 2) on the left side. The oil collected on the inner peripheral face of the cylinder 34 drops downward.

FIG. 1 and FIG. 2 will be referred to again. The lead-out port 20 communicates with an intake manifold (not shown in the drawings). The blow-by gas passed through the main separate portion 18 is supplied to an inlet system of the engine through the lead-out port 20.

The oil reflux passages 22 open and are disposed on a lower side of the pre-separate portion 16, and the respective oil particle removal mechanisms 32, and join together to communicate with the crank chamber. The oil collected at the pre-separate portion 16 and the main separate portion 18 drops by the gravity, and is guided to the oil reflux passages 22 to be refluxed to the crank chamber.

A specific embodiment has been explained above; however, the present invention is not limited to the aforementioned embodiment, and can be widely modified. For example, the shape of the annular shoulder face may have a polygonal annular shape in place of the annular shape, and in that case, the shape of the circular plate portion of the valve member and the shape of the lower portion of the cylinder are formed in a polygonal shape in the same manner. Also, in order to always make the separate distance B between the upper side end face of the valve member 36 and the tip of the projecting piece 46 smaller than the interval A between the outer peripheral face of the circular plate portion 50 and the inner peripheral face of the cylinder 34, in place of setting the spring constant of the spring device 40, or with the setting of the spring constant, there may be provided a stopper controlling the valve member 36 from moving downward. Also, the shape of the groove 48 may be changed by rounding off, or providing a step to suppress generation of turbulence. Also, in a support structure between the valve member 36 and the support member 38, there may be provided a receiver hole on a valve member 36 side, and provided a shaft received in the receiver hole on a support member 38 side. Also, on one of a side face of the valve member 36 and the inner peripheral face of the cylinder 34 facing the side face of the valve member 36, there may be provided a projecting piece extending up and down, and on the other of the side face of the valve member 36 and the inner peripheral face of the cylinder 34 facing the side face of the valve member 36, there may be provided a guide groove receiving the projecting piece thereof. Also, each member may change a direction thereof within a range where the collected oil can be guided to the oil reflux passages 22 by the gravity. For example, the shaft of a small-diameter oil particle removal mechanism may incline.

EXPLANATION OF SYMBOLS

10 . . . an oil separator, 12 . . . a housing, 14 . . . a lead-in port, 16 . . . a pre-separate portion, 18 . . . a main separate portion, . . . a lead-out port, 22 . . . an oil reflux passage, 24 . . . a constricted portion, 26 . . . a bent portion, 28 . . . a first partition plate, 30 . . . a second partition plate, 32 . . . an oil particle removal mechanism, 34 . . . a cylinder, 36 . . . a valve member, 38 . . . a support member, 40 . . . a spring device, 42 . . . an annular shoulder face, 44 . . . a peripheral wall, 46 . . . a projecting piece, 48 . . . a groove, 50 . . . a circular plate portion, 52 . . . a shaft portion, 54 . . . a first side face, 56 . . . a second side face, 58 . . . a receiver hole, 60 . . . a spring receiver hole, 62 . . . a horizontal groove, A . . . an interval between the first side face 54 of the circular plate portion 50 and an inner peripheral face of the cylinder 34, B . . . a separate distance between an upper side end face of the valve member 36 and a tip of the projecting piece 46

What is claimed is:

1. An oil separator for separating oil in a blow-by gas for an internal combustion engine, comprising:
    a housing including a cylinder for a flow passage for the blow-by gas, an inlet for allowing the blow-by gas to enter the cylinder, an annular shoulder face surrounding the inlet, a peripheral wall face extending from an outer periphery of the annular shoulder face in a direction away from the inlet, and a support member protruding from a bottom portion of the housing toward the cylinder;
    a valve member disposed inside the cylinder, and movable between a blocking position abutting an end face thereof against the annular shoulder face to block the flow passage, and an open position separating the end face from the annular shoulder face to open the flow passage, the valve member including a first side face facing the peripheral wall face and spaced from the peripheral wall face at a predetermined interval;
    a spring device supported with the support member and urging the valve member toward the blocking position, the spring device having a spring constant such that the valve member moves to the open position against an urging force of the spring device by a differential pressure inside the flow passage; and
    a reflux device provided inside the housing for refluxing the oil separated from the blow-by gas to a crank chamber,
    wherein a gap between the end face of the valve member and the annular shoulder face in the open position is narrower than the interval between the first side face of the valve member and the peripheral wall face regardless of a flow volume of the blow-by gas, and
    the support member includes
        a spring receiver hole formed at a center of an upper portion of the support member and extending downwardly from an upper surface of the support member to receive the spring device,
        a receiver hole formed coaxially to the spring receiver hole and extending downwardly beyond the spring receiver hole to receive a lower portion of the valve member, the receiver hole having a diameter less than that of the spring receiver hole, and
        a groove arranged at a downstream of the spring receiver hole and communicating with the receiver hole, for discharging the oil entered into the receiver hole through the spring receiver hole.

2. An oil separator according to claim 1, wherein the annular shoulder face includes a projecting piece formed annularly and coaxially thereto, and abuts against the valve member at a tip of the projecting piece.

3. An oil separator according to claim 2, wherein the projecting piece includes an inner peripheral face formed such that an inner diameter thereof increases as extending toward a bottom thereof.

4. An oil separator according to claim 1, wherein the valve member includes a second side face extending in a direction away from the first side face, and formed to separate from the peripheral wall face as extending toward a bottom thereof.

5. An oil separator according to claim 1, wherein the flow passage includes a plurality of branching flow passages disposed in parallel, and the annular shoulder face and the valve member are provided in the respective branching flow passages.

6. An oil separator according to claim 1, wherein a direction of a reciprocation of the valve member is a vertical direction, and the reflux device is disposed below the valve member.

7. An oil separator according to claim 1, wherein the housing further comprises a pre-separate portion formed from one portion of the flow passage at an upstream side of the annular shoulder face, and
    the flow passage of the pre-separate portion includes a constricted portion wherein a flow passage cross-sectional area is constricted, and a bent portion disposed on a downstream of the constricted portion and including a flow passage bent relative to the flow passage of the constricted portion.

8. An oil separator for separating oil in a blow-by gas for an internal combustion engine, comprising:
    a housing including a cylinder for a flow passage for the blow-by gas, an inlet for allowing the blow-by gas to enter the cylinder, an annular shoulder face which is flat and surrounds the inlet, a peripheral wall face extending from an outer periphery of the annular shoulder face in a direction away from the inlet, and a projecting piece formed annularly on the annular shoulder face and coaxial to the inlet, the projecting piece protruding downwardly and arranged between the inlet and the peripheral wall face;
    a valve member disposed inside the cylinder, and movable between a blocking position abutting an end face thereof against the projecting piece to block the flow passage, and an open position separating the end face from the projecting piece to open the flow passage, the valve member including a side face facing the peripheral wall face and spaced from the peripheral wall face at a predetermined interval;
    a spring device urging the valve member toward the blocking position, and having a spring constant so that the valve member moves to the open position against an urging force of the spring device by a differential pressure inside the flow passage; and
    a reflux device provided inside the housing for refluxing the oil separated from the blow-by gas to a crank chamber,
    wherein a gap between the end face of the valve member and the projecting piece in the open position is narrower than the interval between the side face of the valve member and the peripheral wall face regardless of a flow volume of the blow-by gas, and
    the projecting piece is disposed annularly at a position away from the inlet and the peripheral wall face and has an inner diameter increasing from the annular shoulder face toward the valve member and an outer diameter constant from the annular shoulder face toward the valve member.

9. An oil separator according to claim 8, wherein a support member includes
    a spring receiver hole formed at a center of an upper portion of the support member and extending downwardly from an upper surface of the support member to receive the spring device,
    a receiver hole formed coaxially to the spring receiver hole and extending downwardly beyond the spring receiver hole to receive a lower portion of the valve member, the receiver hole having a diameter less than that of the spring receiver hole, and a groove arranged at a downstream of the spring receiver hole and communicating with the receiver hole, for discharging the oil entered into the receiver hole through the spring receiver hole.

10. An oil separator according to claim 8, wherein a groove is formed between the projecting piece and the peripheral wall face, and the end face of the valve member extends radially outwardly beyond the projecting piece to overlap the groove in the downstream.

* * * * *